(12) United States Patent
Bardouillet et al.

(10) Patent No.: US 6,919,794 B2
(45) Date of Patent: Jul. 19, 2005

(54) CIRCUIT FOR CONTROLLING THE RANDOM CHARACTER OF A RANDOM NUMBER GENERATOR

(75) Inventors: Michel Bardouillet, Rousset (FR); William Orlando, Peynier (FR); Alexandre Malherbe, Trets (FR); Claude Anguille, Banc Bel Air (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 10/865,011

(22) Filed: Jun. 10, 2004

(65) Prior Publication Data

US 2004/0263320 A1 Dec. 30, 2004

(51) Int. Cl.[7] .............................................. H03K 21/00
(52) U.S. Cl. ...................... 340/146.2; 377/33; 377/51; 377/54; 380/267; 714/728; 714/739; 714/761; 714/787
(58) Field of Search ....................... 340/146.2; 377/33, 377/51, 54; 380/267; 714/728, 739, 761, 787

(56) References Cited

U.S. PATENT DOCUMENTS 3,217,145 A 11/1965 Suski
3,582,882 A 6/1971 Titcomb et al.
5,956,401 A * 9/1999 Harrison ..................... 709/224

OTHER PUBLICATIONS

French Search Report from French Patent Application 03/07088, filed Jun. 12, 2003.
J. Phillips: "Algorithm AS 48. Uncertainty Function for a Binary Sequence" Applied Statistics, vol. 21, 1972, pp. 97–99, XP0008029574 Royal Statistical Society, London, GB.
A. Rukhin et al.: "A statistical test suite for random and pseudorandom number generators for cryptographic applications" May 15, 2001, XP002276676, pp. iv–x, 29–36, 46–49, 77, 78, 87–89.

* cited by examiner

*Primary Examiner*—Margaret R. Wambach
(74) *Attorney, Agent, or Firm*—Lisa K. Jorgenson; James H. Morris; Wolf, Greenfield & Sacks, P.C.

(57) ABSTRACT

A circuit for controlling the random character of a bit flow, including an input shift register receiving the bit flow and having its outputs exploited in parallel, at least one element for comparing at least a partial content of the input register with predetermined patterns, a plurality of counters in a number at most equal to the number of predetermined patterns, and an element for detecting the exceeding of at least one threshold by one of the counters, the result of this detection conditioning the state of a word or bit indicative of the random or non-random character of the bit flow.

12 Claims, 1 Drawing Sheet

CIRCUIT FOR CONTROLLING THE RANDOM CHARACTER OF A RANDOM NUMBER GENERATOR

BACKGROUND OF THE INVENTION

1. Field of the Invention

The present invention relates to the field of random number generators and more specifically to random number generators formed in an integrated circuit.

2. Discussion of the Related Art

The quality of a random generator is measured by the quality of its random character, that is, the generator's equiprobability to output any number.

Currently, random generators are, when designed, generally tested on a characterization batch enabling checking the quality of the random character. This quality of the random character is however not tested for each manufactured chip. At the end of the manufacturing, a functional test of the chip, but not of the random character's reliability, is generally performed.

Random generators are often used in algorithmic processing applications involving secret keys, and especially to mask the keying of these secret keys by the algorithms. The quality of the random character is of major importance in this type of application since this conditions the security of the data handling process.

Further, random generators, even if they operate properly at the end of the manufacturing, may be sensitive to drifts. Indeed, like any function implemented by an integrated circuit, the random generator may especially be sensitive to heat differences which are then likely to condition the quality of the random character.

It would thus be desirable to be able to validate the quality of a random character of an integrated generator in a chip.

SUMMARY OF THE INVENTION

The present invention aims at providing an integrated circuit enabling checking the random character of numbers provided by an integrated random generator.

The present invention also aims at providing a real-time information about the quality of the random character and thus enables detecting a possible operating drift of the random generator.

The present invention also aims at providing a solution which is implemented in hardware fashion and thus overcoming the fragility of software solutions.

To achieve these and other objects, the present invention provides a circuit for controlling the random character of a bit flow, comprising:

an input shift register receiving the bit flow, having its outputs exploited in parallel;

at least one element for comparing at least a partial content of the input register with predetermined patterns;

a plurality of counters in a number at most equal to the number of predetermined patterns, controlled according to the comparison result; and an element for detecting the exceeding of at least one threshold by one of the counters, the result of this detection conditioning the state of a word or bit indicative of the random or non-random character of the bit flow.

According to an embodiment of the present invention, said counters are preloaded to a median count, the difference of each counter with the median count being periodically divided by an integer to normalize the differences.

According to an embodiment of the present invention, the period of counter normalization to the median value is greater than $2^{n-1}/f.h$ comparison cycles, where n designates the number of bits of the input register, where f designates the normalization factor, and where h designates the increment or decrement step.

According to an embodiment of the present invention, for an input register over n bits, the number of patterns is at most n.

According to an embodiment of the present invention, the occurrence of one of the patterns translates as an incrementation of the corresponding counter by a value $2^{n-1}$ and a decrementation of all the other counters by one unit.

According to an embodiment of the present invention, the detector detects an overflow of one of said counters.

According to an embodiment of the present invention, the circuit is integrated on the same chip as the random generator that it is supposed to monitor.

The foregoing objects, features, and advantages of the present invention will be discussed in detail in the following non-limiting description of specific embodiments in connection with the accompanying drawings.

DETAILED DESCRIPTION

Figure 1:
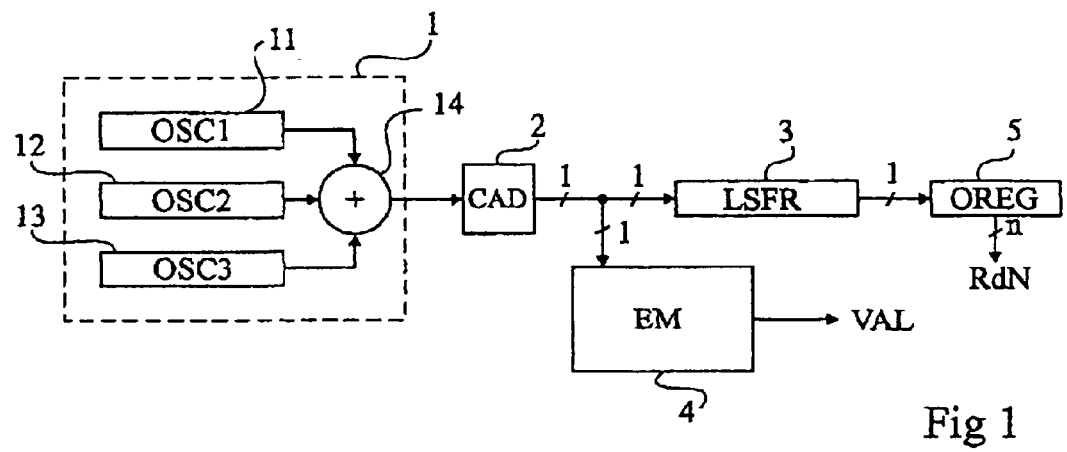
FIG. 1 schematically shows, in the form of blocks, an embodiment of a random generator according to the present invention.

The same elements have been designated with the same reference numerals in the different drawings. For clarity, only those circuit and generator elements that are necessary to the understanding of the present invention have been shown in the drawings and will be described hereafter.

FIG. 1 very schematically shows an embodiment of a random generator according to the present invention.

Such a generator conventionally uses an analog noise source 1, having its result converted into at least one bit flow by an analog-to-digital converter 2 (ADC). The bit flow delivered by the converter is then processed, for example, by a linear feedback shift register (LSFR) having its output providing a random bit flow Rd. The use of such a linear feedback register is an example of the structure of a random generator that may be replaced with any other conventional system. Most often, flow Rd is set-up over several bits (for example, n) according to the number of bits of the random number to be generated. For example, flow Rd is then sent to the input of an output shift register 5 (OREG) having its n bits read in parallel to form random number RdN. As an alternative, the content of register 3 is read in parallel.

In the shown example, an analog noise source 1 formed of three free oscillators 11, 12, and 13 (OSC1, OSC2, OSC3) having their respective outputs added up (ADDER 14) to provide the analog noise at the input of converter 2 has been assumed.

What has been described hereabove corresponds to the structure of a conventional integrated circuit random generator.

According to the present invention, the bit flow resulting from converter 2 is sent in parallel onto a circuit 4 (EM) for checking the random character of this flow. As an alternative, the input of circuit 4 may be placed at the output of linear feedback shift register 3, knowing that register 3 already improves the "random" statistic distribution and thus risks masking defects specific to source 1. Circuit 4 provides a word or bit VAL for validating the random character of bit flow Rd.

The random generator structure discussed in relation with FIG. 1 is an example only. Other conventional generators, and in particular other analog noise sources, may be used. To implement the present invention, the bit flow, the random character of which is desired to be checked, must only be available at the input of circuit 4.

Figure 2:
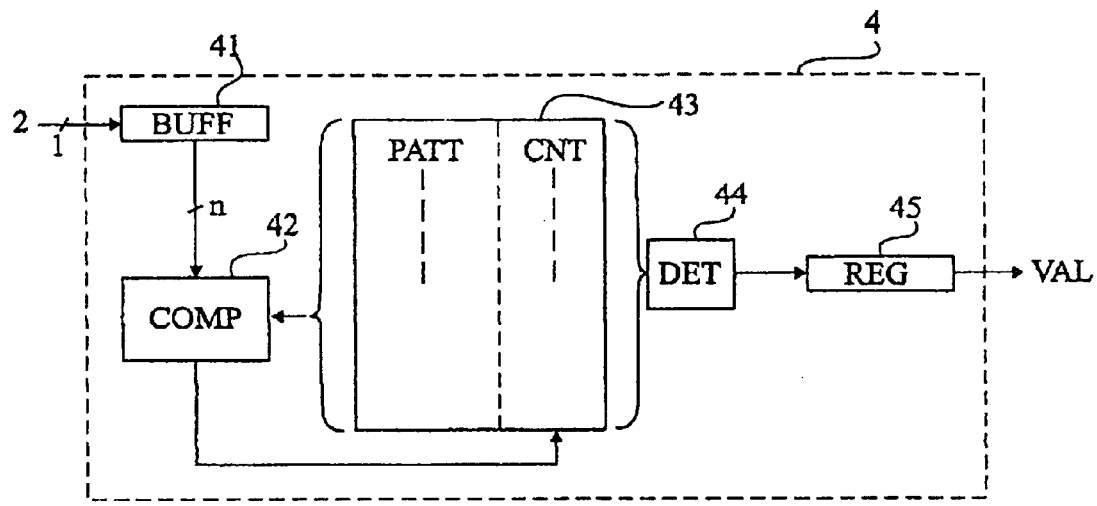
FIG. 2 schematically shows in the form of blocks an embodiment of a circuit for checking the random character of a random number generator.

FIG. 2 shows an embodiment of a circuit 4 for checking the random character of a bit flow according to the present invention.

Circuit 4 comprises a shift input register 41 (BUFF) over n bits receiving the bit flow resulting from converter 2.

The size (number of bits) of input register 41 of circuit 4 is at least one bit. The size of register 41 theoretically has no maximum. In practice, a register having a size which is at most that (n bits) of the random number provided by the generator will preferably be chosen.

According to the present invention, the content of register 41 over n bits is compared by a circuit 42 (COMP) to predetermined patterns (PATT) stored in a table 43 of circuit 4. Preferably, table 43 is hard-stored, that is, the patterns which correspond to examples of characteristic words over n bits enabling checking of the random character, are stored in non-volatile fashion.

Table 43 comprises, associated with each pattern, a counter CNT of the number of occurrences of this pattern. A bank of patterns and a bank of associated counters are thus available.

Periodically, comparator 42 compares the content of register 41 with the patterns pre-stored in table 43 and, at least and according to the chosen embodiment, increases or decreases the count of the counter associated with the found pattern. The examination of the counter content thus enables checking the random character. Indeed, if one of the patterns comes about too often, this means that its generator has a random character defect. Considering the example of a random drawing over one bit, the number of 0s and of 1s must be statistically equal.

Circuit 4 thus comprises a detector 44 in charge of detecting an exceeding of one of counts CNT of table 43 with respect to a determined threshold. A preferred embodiment of such a detection will be discussed hereafter. Detector 44 provides its result to an output register 45 that contains the word or, for simplification, bit VAL for validating the random character of the bit train provided by the generator.

It should be noted that the higher the number n of bits, the more the pseudo-periods generating weaknesses in the random drawing are controlled. Thus, ideally, table 43 exhaustively contains all possible patterns PATT. For example, for eight-bit registers, table 43 contains 256 patterns.

According to an alternative embodiment, the number of patterns in table 43 may be reduced by grouping similar patterns. The number of counters is thus at most equal to the number of patterns to be monitored. The similar character of a pattern depends on the period with which the content of register 41 is compared with the patterns of table 43. Ideally, the content of register 41 is compared for each new incoming bit. Taking this example, and for a 4-bit word, counting the occurrences of words 0101 is the same thing as counting the occurrences of words 1010. Of course, weightings may then be provided if the equiprobability is desired to be guaranteed. The different weightings may be replaced with (or combined with) different thresholds for the different counters.

Detector 44 corresponds, in a simplified version, to the detection of the possible limits of the counters (overflows). Of course, intermediary thresholds may be provided.

According to one embodiment of the present invention, the counting is performed from counters preloaded to a median or average value upon starting. Afterwards, for each pattern search period, comparator 42 increases the count of the detected pattern by a quantity $2^n-1$ and decreases the count of all other patterns by one unit. Such an embodiment avoids filling of the counters along the system operation. In normal operation with a properly random generator, no counter overflows, and if an overflow occurs, this means that the generator is not random. However, the counters must be sufficiently large to respect the fact that the random character can only be checked over large quantities of numbers.

To avoid use of too large counters, the counts are preferably periodically brought down to the average (median value) with the same difference. In a way, a normalization with respect to this median value is performed. For this purpose, all the differences with respect to the average value (median count of the counter) are divided by a predetermined integer (for example, 2).

Figure 3:
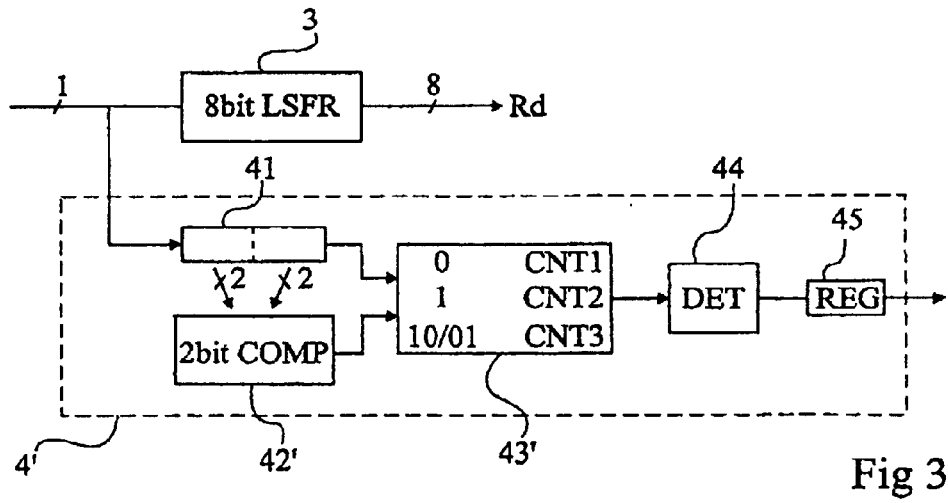
FIG. 3 illustrates an alternative random character checking circuit according to the present invention.

FIG. 3 shows an alternative embodiment of a random character checking circuit 4' for which only so-called basic defects of the random generator are desired to be detected. Basic defects for example comprise detecting a synchronization of the oscillators. In such a case, the output bit train is a succession of 0s and 1s. Two bits are then sufficient to detect the random defect. Among so called basic defects, it may also be attempted to detect too long sequences of 0s and 1s.

In this embodiment, a word Rd over 8 bits provided by register 3 and a circuit 4' comprising an input register 41' over 2 bits and a comparator 42' of patterns of 2 bits each are assumed. Table 43' only contains four patterns, that is, 0, 1, 10, and 01, and three counters CNT1 (for 0s), CNT2 (for 1s), and CNT3 (for 10s and 01s). Counters over 32 bits are for example used and detector 44 is used to detect a possible overflow of each counter.

Each time a bit arrives on the input flow and is stored in register 41', its least significant bit is compared (by a comparator not shown or by counter 42' according to its structure) with the first two patterns (0 and 1) on a bit of table 43'.

Each time a 0 is detected, counter CNT1 is incremented by 1, and otherwise set back to 0. Accordingly, an overflow of counter CNT1 detects a flow of 32 bits at 0 which are considered as representing a random defect.

Each time a 1 is detected, counter CNT2 is incremented by 1, and otherwise reset (set back to zero). Similarly, detector 44 detects an overflow of counter CNT2 for example over 32 bits which indicates a flow of 32 consecutive states 1.

Comparator 42' is used, in this embodiment, to compare the pattern of the two bits of register 41' with patterns 10 and 01. In case of an identity, counter CNT3 is incremented. Then, at the next period where register 41' is filled by shifting, the introduced bit is compared with the preceding bit (right-hand bit). If the bits are identical, counter CNT3 is set back to zero. Accordingly, when patterns 11 and 00 arrive after patterns 10 or 01, counter CNT3 is reset.

Such an embodiment enables detecting on a 32-bit occurrence the four elementary patterns with only three counters over 5 bits.

As an alternative, it is possible to only use two registers and two counters (CNT1 and CNT2 of FIG. 3) by taking into account one bit out of two only and resetting the counters at each consecutive doublet.

The sequencing of a random character checking circuit 4 or 4' according to the present invention is within the abilities of those skilled in the art based on the functional indications given hereabove and on the application.

Similarly, the thresholds from which it is considered that the bit flow is no longer equiprobable are determined, preferably, by making a compromise between the desired reliability and the counter size.

In the preferred embodiment of the present invention, the counter size conditions the periodicity of the normalization around the average value.

The normalization period is at least greater than $2^{n-1}/f.h$ comparison cycles, where f designates the normalization factor (factor of the division of the differences with respect to the median value) and where h designates the increment or decrement step. This relation is applied separately to the increment and decrement steps and the largest calculated period is selected (most constraining case).

According to an alternative embodiment where the thresholds do not correspond to counter overflows, the variation along time of a loss of the random character of the generator may be followed, for example, by storing and exploiting the times during which the thresholds are exceeded before it is returned within the acceptable range. An overflow may then form a critical threshold. Other intermediary thresholds may be provided.

An advantage of the present invention is that it enables following, in real time, the quality of the random character of a random number generator.

Another advantage of the present invention is that it enables detecting possible attacks on integrated circuit random generators. Indeed, some attacks may include a deformation of the random character to be able to pirate the algorithm or the secret data supposed to be masked by the random numbers. The use of a circuit such as provided by the present invention enables detecting the loss of the random character, whatever its cause (drift, attack, etc.).

Of course, the present invention is likely to have various alterations, modifications, and improvements which will readily occur to those skilled in the art. In particular, although the implementation in wired logic of the pattern table is a preferred embodiment, any conventional volatile or non-volatile storage means may be used.

Further, what use is made of the bit or of the validation word of the random generator depends on the application. For example, this may block the system in case of a random character defect, or trigger an adapted alarm procedure.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for controlling the random character of a bit flow, comprising:
   an input shift register receiving the bit flow, having its outputs exploited in parallel;
   at least one element for comparing at least a partial content of the input register with predetermined patterns;
   a plurality of counters in a number at most equal to the number of predetermined patterns, controlled according to the comparison result; and
   an element for detecting the exceeding of at least one threshold by one of the counters, the result of this detection conditioning the state of a word or bit indicative of the random or non-random character of the bit flow, said counters being preloaded to a median count, the difference of each counter with the median count being periodically divided by an integer to normalize the differences.

2. The circuit of claim 1, wherein the period of normalization of the counters to the median value is greater than $2^{n-1}/f.h$ comparison cycles, where n designates the number of bits of the input register, where f designates the normalization factor, and where h designates the increment or decrement step.

3. The circuit of claim 1, wherein for an input register over n bits, the number of patterns is at most n.

4. The circuit of claim 3, wherein the occurrence of one of the patterns translates as an incrementation of the corresponding counter by a value $2^n-1$ and a decrementation of all the other counters by one unit.

5. The circuit of claim 1, wherein said element for detecting detects a overflow of one of said counters.

6. The circuit of claim 1, integrated on the same chip as the random generator that it aims at monitoring.

7. A method for controlling a random character of a bit flow, comprising:
   comparing at least a partial content of an input register with predetermined patterns;
   controlling a plurality of counters in response to the comparing;
   detecting exceeding of at least one threshold and conditioning a state of a word or bit indicative of the random or non-random character of the bit flow; and periodically normalizing differences in the plurality of counters.

8. The method of claim 7, further comprising preloading the counters with a median count and dividing a difference between each counter and the median count.

9. The method of claim 8, wherein the period of normalization of the counters to the median value is greater than $2^{n-1}/f.h$ comparison cycles, where n designates the number of bits of the input register, where f designates the normalization factor, and where h designates the increment or decrement step.

10. The method of claim 7, wherein for an input register over n bits, the number of patterns is at most n.

11. The method of claim 10, wherein the occurence of one of the patterns translates as an incrementation of the corresponding counter by a value $2^n-1$ and a decrementation of all the other counters by one unit.

12. The method of claim 7, further comprising detecting an overflow of one of the counters.

* * * * *

UNITED STATES PATENT AND TRADEMARK OFFICE
CERTIFICATE OF CORRECTION

PATENT NO.     : 6,919,794 B2
DATED          : July 19, 2005
INVENTOR(S)    : Michel Bardouillet et al.

It is certified that error appears in the above-identified patent and that said Letters Patent is hereby corrected as shown below:

<u>Title page,</u>
Item [30], should read:

--          [30]    Foreign Application Priority Data
June 12, 2003 (FR)……………………………..03 07088 --.

Signed and Sealed this

Twenty-seventh Day of September, 2005

JON W. DUDAS
*Director of the United States Patent and Trademark Office*